United States Patent
Obika (10) Patent No.: US 8,497,046 B2
(45) Date of Patent: Jul. 30, 2013

(54) SEALING STRUCTURE FOR FUEL CELL

(75) Inventor: Motoharu Obika, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1065 days.

(21) Appl. No.: 12/085,192

(22) PCT Filed: Nov. 24, 2006

(86) PCT No.: PCT/JP2006/324049
§ 371 (c)(1),
(2), (4) Date: May 19, 2008

(87) PCT Pub. No.: WO2007/072671
PCT Pub. Date: Jun. 28, 2007

(65) Prior Publication Data
US 2009/0280375 A1   Nov. 12, 2009

(30) Foreign Application Priority Data
Dec. 22, 2005   (JP) .................................. 2005-369790

(51) Int. Cl.
*H01M 8/24* (2006.01)
*H01M 2/14* (2006.01)
*H01M 8/10* (2006.01)

(52) U.S. Cl.
USPC .......................................... 429/469; 429/508

(58) Field of Classification Search
USPC .................. 429/458–461, 463, 469, 507–511
See application file for complete search history.

(56) References Cited

U.S. PATENT DOCUMENTS

| | | | |
|---|---|---|---|
| 6,440,597 B1 | 8/2002 | Mizuno | |
| 6,602,632 B2 | 8/2003 | Wakahoi et al. | |
| 7,351,490 B2 | 4/2008 | Tanaka et al. | |
| 7,790,329 B2* | 9/2010 | Morimoto et al. | 429/483 |
| 2002/0064703 A1* | 5/2002 | Mizuno | 429/35 |
| 2002/0081480 A1 | 6/2002 | Inoue et al. | |
| 2002/0119362 A1* | 8/2002 | Chen et al. | 429/35 |
| 2002/0122970 A1* | 9/2002 | Inoue et al. | 429/35 |
| 2003/0150162 A1 | 8/2003 | Inagaki et al. | |

(Continued)

FOREIGN PATENT DOCUMENTS

| | | |
|---|---|---|
| CA | 2 437 835 A1 | 9/2002 |
| CN | 1510770 A | 7/2004 |
| JP | 2000-182639 A | 6/2000 |
| JP | 2002-141082 A | 5/2002 |

(Continued)

*Primary Examiner* — Barbara Gilliam
*Assistant Examiner* — Stephan Essex
(74) *Attorney, Agent, or Firm* — Foley & Lardner LLP (57) ABSTRACT

An anode (11a) and a cathode (11b) are provided on either side of an electrolyte membrane (11). A first separator (2) is disposed so as to face the anode (11a), and a second separator (3) is disposed so as to face the cathode (11b). A first sealing member (12) is disposed between the electrolyte membrane (11) and the first separator (2), and a second sealing member (13) is disposed between the electrolyte membrane (11) and the second separator (3). The cross-sectional shape or rubber hardness of the sealing members (12, 13) is varied according to a deformation amount generated in the electrolyte membrane (11) by a sealing reactive force. More specifically, in a site where the deformation amount of the electrolyte membrane (11) is large, either the contact area between the sealing member (12) and the electrolyte membrane (11) is increased, or the rubber hardness of the sealing member (12) is reduced. In so doing, deformation of the electrolyte membrane (11) caused by the sealing reactive force is suppressed, and the sealing performance of a fuel cell (10) is improved.

20 Claims, 8 Drawing Sheets

U.S. PATENT DOCUMENTS

| | | | |
|---|---|---|---|
| 2004/0062958 A1* | 4/2004 | Facchi et al. | 429/13 |
| 2004/0185322 A1 | 9/2004 | Tanaka et al. | |
| 2004/0191604 A1 | 9/2004 | Artibise et al. | |
| 2004/0224212 A1 | 11/2004 | Wakahoi et al. | |
| 2005/0214620 A1 | 9/2005 | Cho et al. | |

FOREIGN PATENT DOCUMENTS

| | | |
|---|---|---|
| JP | 2004-165125 A | 6/2004 |
| JP | 2004-235031 A | 8/2004 |
| JP | 2005-285712 A | 10/2005 |

* cited by examiner

SEALING STRUCTURE FOR FUEL CELL

TECHNICAL FIELD OF THE INVENTION

This invention relates to a sealing structure for a fuel cell.

BACKGROUND OF THE INVENTION

A polymer electrolyte fuel cell typically comprises a membrane electrode assembly (to be referred to as an "MEA" hereafter), and a pair of separators laminated onto either surface of the MEA. The MEA comprises an electrolyte membrane, an anode formed on one surface of the electrolyte membrane, and a cathode formed on the other surface of the electrolyte membrane. The output voltage of a single fuel cell is low, and therefore a large number of fuel cells are typically laminated to each other for use as a fuel cell stack.

A hydrogen (H2) passage is formed in the separator facing the anode. An anode gas containing a large amount of hydrogen is supplied to the hydrogen passage. An oxygen (O2) passage is formed in the separator facing the cathode. A cathode gas containing a large amount of oxygen is supplied to the oxygen passage. The hydrogen (H2) that contacts the anode emits an electron (e+), then forms a hydrogen ion (H+) that passes through the electrolyte membrane and moves to the cathode. The flow of emitted electrons (e+) forms the output of the fuel cell.

Thus, the anode gas and cathode gas flow along the passages in the separators while contacting the anode and cathode. To prevent the anode gas and cathode gas from leaking out of the fuel cell, a sealing member is sandwiched between the separator and the electrolyte membrane.

When fuel cells are laminated into a fuel cell stack, the sealing member sandwiched between the separator and the electrolyte membrane remains tightly adhered to the separator and electrolyte membrane while deforming elastically. The elastically deformed sealing member applies a repulsive force to the separator and electrolyte membrane. In the following description, this repulsive force generated by the elastically deformed sealing member will be referred to as a sealing reactive force.

The electrolyte membrane is less rigid than the separator and is therefore easily deformed by the sealing reactive force. However, when the electrolyte membrane deforms, the sealing performance of the sealing member deteriorates.

DISCLOSURE OF THE INVENTION

JP2004-165125A, published by the Japan Patent Office in 2004, proposes that the electrolyte membrane be held by a resin frame to prevent the electrolyte membrane from deforming in this manner.

However, when a resin frame is used in the prior art, the thickness of the fuel cell increases, and as a result, an increase in the dimensions of the fuel cell stack is inevitable.

It is therefore an object of this invention to secure a favorable sealing performance in a sealing member without increasing the thickness of a fuel cell.

In order to achieve the object described above, this invention provides a sealing structure for use with a fuel cell that comprises an electrolyte membrane having an electrode formed on a surface thereof, and a separator formed with a gas passage that faces the electrode. The sealing structure comprises an elastic sealing member sandwiched between the electrolyte membrane and the separator, and is constituted such that a contact surface pressure of the sealing member relative to the electrolyte membrane decreases steadily toward a site of the sealing member in which a sealing reactive force thereof causes the electrolyte membrane to deform by a large amount.

The details as well as other features and advantages of this invention are set forth in the remainder of the specification and are shown in the accompanying drawings.

DESCRIPTION OF THE PREFERRED EMBODIMENTS

Figure 1:
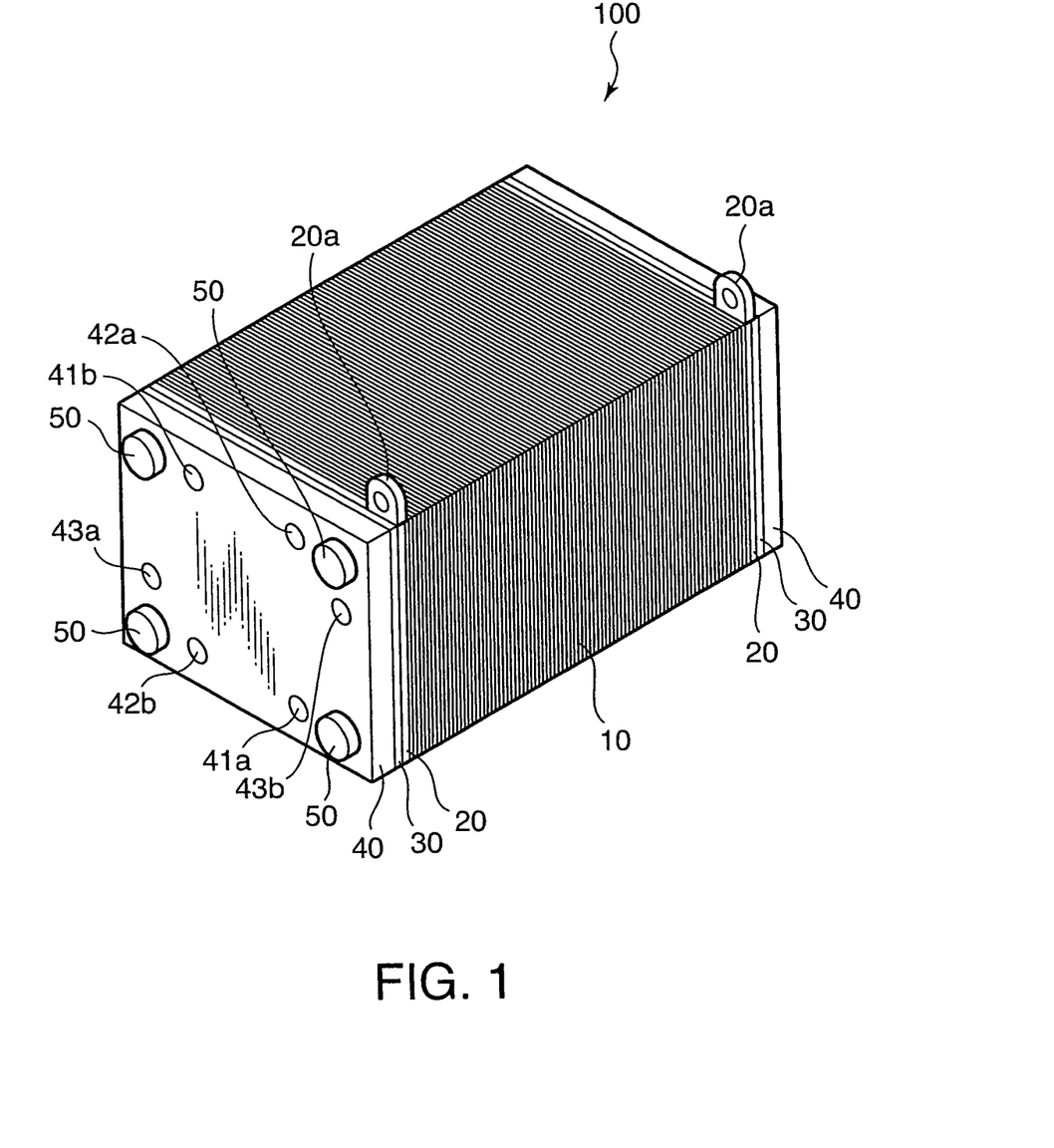
FIG. 1 is a perspective view of a fuel cell stack to which this invention is applied.

Referring to FIG. 1 of the drawings, a fuel cell stack 100 for installation in an automobile comprises a large number of laminated polymer electrolyte fuel cells 10. A pair of current collectors 20 are laminated onto the respective ends of the laminated fuel cells 10, and a pair of insulating plates 30 are laminated onto the outside thereof. This laminated body is sandwiched by a pair of endplates 40.

Figure 8:
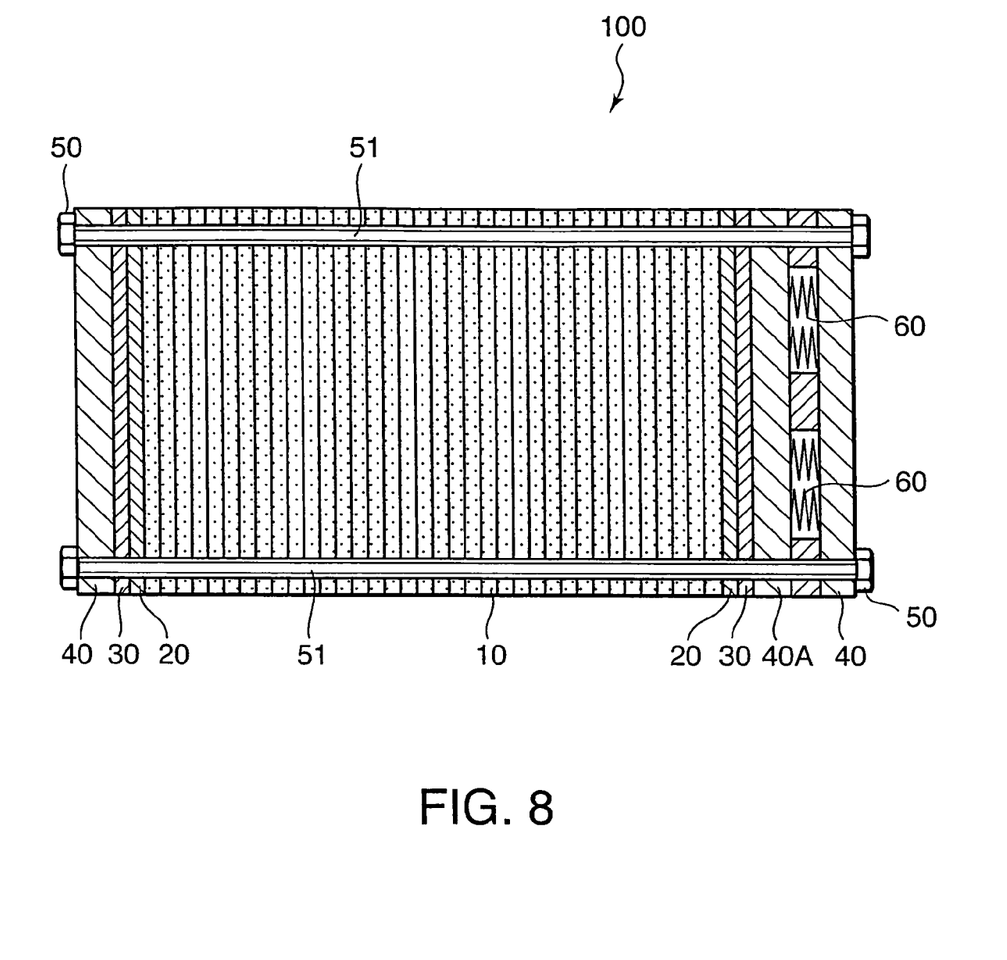
FIG. 8 is a longitudinal sectional view of a fuel cell stack to which this invention is applied.

Referring to FIG. 8, a second endplate 40A and a pressurizing device 60 employing a spring are sandwiched between one of the endplates 40 and one of the insulating plates 30. The fuel cell stack 100 is integrated by tension bolts 51 that penetrate the laminated body of the fuel cells 10 at the four corners of the respective plates 20, 30, 40, 40A, and nuts 50 tightened to both ends of the tension bolts 51. The pressurizing device 60 applies a constant compressive force to the laminated fuel cells 10 by pressing the second endplate 40A with the repulsive force of the spring. The fuel cell stack 100 may be integrated without inserting the tension bolts 51 through the laminated body of the fuel cells 10, current collectors 20, and insulating plates 30, and instead inserting the tension bolts 51 into two endplates 40 disposed on the outside of the laminated body and formed to be slightly larger than the transverse section of the laminated body, and tightening nuts 50 to the tension bolts 51.

The fuel cell 10 has an excitation voltage of approximately one volt (V). The current collector 20 is constituted by a gas-impermeable conductive member such as densified carbon.

Returning to FIG. 1, the current collector 20 comprises an output terminal 20a on its upper side. Power generated by the fuel cell stack 100 is extracted by the output terminal 20a. The insulating plate 30 is constituted by an insulating member made of rubber or the like. The endplate 40 and second endplate 40a are made of a metallic material possessing rigidity, such as steel plate. The tension bolt 51 is made of a metallic material possessing rigidity, such as steel. To prevent short-circuiting between the fuel cells 10, the surface of the tension bolt 51 is subjected to insulation processing.

An anode gas supply manifold 41a, an anode gas discharge manifold 41b, a cathode gas supply manifold 42a, a cathode gas discharge manifold 42b, a cooling water supply manifold 43a, and a cooling water discharge manifold 43b, formed respectively in a longitudinal direction of the fuel cell stack 100, open onto one of the endplates 40.

When the endplate 40 on the lower left side of the figure is seen from the front, the anode gas discharge manifold 41b is formed in a leftward part of an upper end of the endplate 40, and the cathode gas supply manifold 42a is formed in a rightward part of the upper end of the endplate 40. The cathode gas discharge manifold 42b is formed in a leftward part of a lower end of the endplate 40, and the anode gas supply manifold 41a is formed in a rightward part of the lower end of the endplate 40. Further, the cooling water supply manifold 43a is formed in a lower portion of a left end of the endplate 40, and the cooling water discharge manifold 43b is formed in an upper portion of a right end of the endplate 40.

Figure 2:
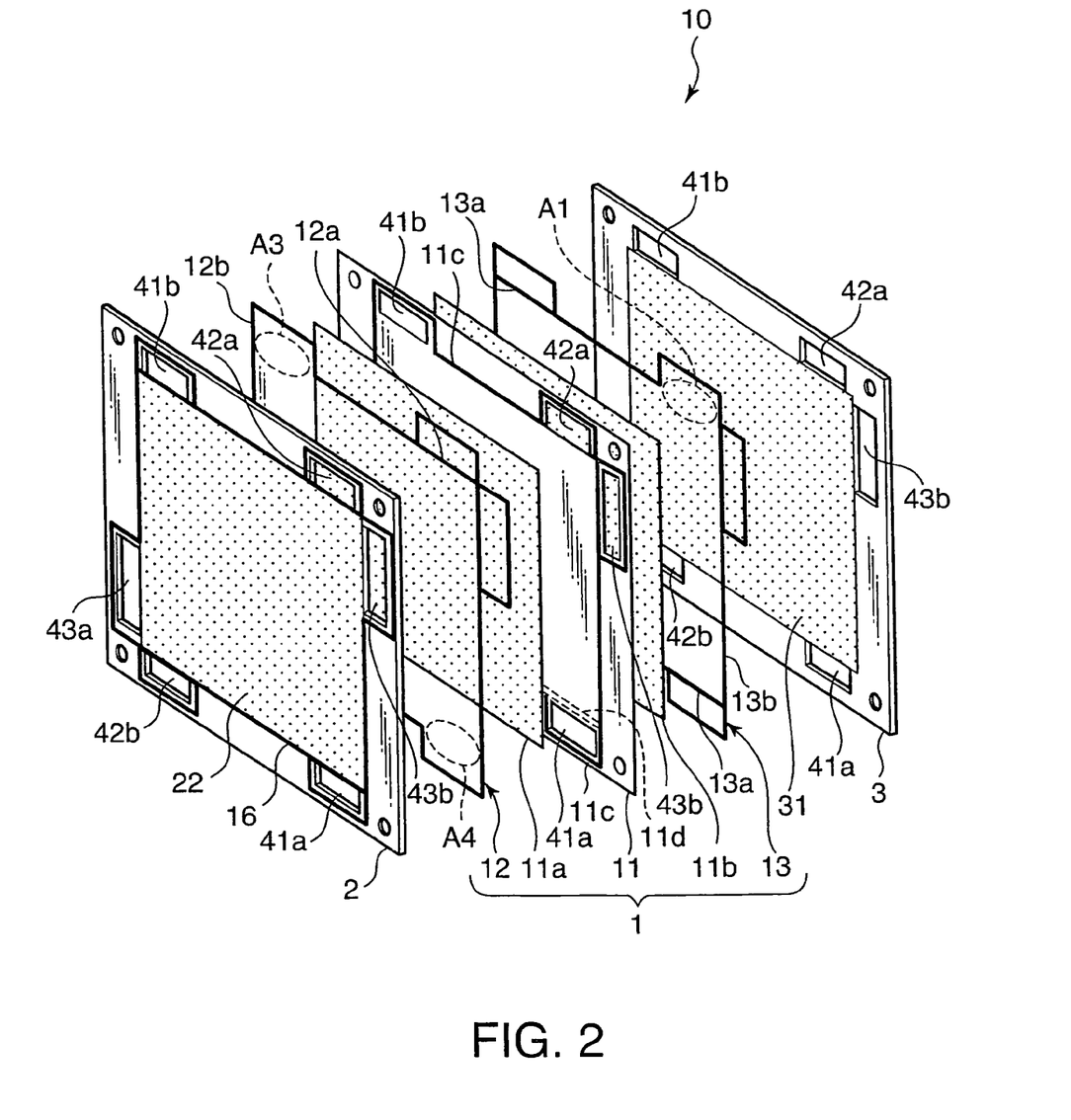
FIG. 2 is a schematic exploded perspective view of a fuel cell, illustrating a sealing structure for a fuel cell according to this invention.

Referring to FIG. 2, the fuel cell 10 comprises an MEA 1, and a first separator 2 and a second separator 3 sandwiching the MEA 1.

The MEA 1 comprises an electrolyte membrane 11, an anode 11a, a cathode 11b, strip-form resin films 11c, 11d, and sealing members 12, 13. The anode 11a, resin film 11c, and sealing member 12 are disposed on one surface of the electrolyte membrane 11 facing the first separator 2. The cathode 11b, resin film 11d, and sealing member 13 are disposed on the other surface of the electrolyte membrane 11 facing the second separator 3.

The electrolyte membrane 11 is constituted by a proton conductive ion exchange membrane formed from a fluorine-based resin. The electrolyte membrane 11 exhibits favorable electric conductivity in a moistened state.

The first separator 2 contacts the anode 11a via the sealing member 12. The second separator 3 contacts the cathode 11b via the sealing member 13. The first separator 2 and second separator 3 are formed from thin metal plates exhibiting sufficient conductivity, strength and corrosion resistance. The dimension of the separators 2 and 3 in a transverse direction of the fuel cell stack 100 is substantially equal to the dimension of the electrolyte membrane 11.

The aforementioned anode gas supply manifold 41a, anode gas discharge manifold 41b, cathode gas supply manifold 42a, cathode gas discharge manifold 42b, cooling water supply manifold 43a, and cooling water discharge manifold 43b respectively penetrate the electrolyte membrane 11 and the separators 2, 3. An opening portion of each of the manifolds, formed in the endplate 40 as described above, is circular, but the transverse section of the manifolds formed to penetrate the electrolyte membrane 11 and the separators 2, 3 is rectangular.

The anode 11a is formed on one surface of the electrolyte membrane 11. The anode 11a is formed with smaller dimensions than the electrolyte membrane 11 so as to be positioned within a region surrounded by the anode gas supply manifold 41a, anode gas discharge manifold 41b, cathode gas supply manifold 42a, cathode gas discharge manifold 42b, cooling water supply manifold 43a, and cooling water discharge manifold 43b.

The anode 11a comprises a gas diffusion layer, a water repellent layer, and a catalyst layer. The gas diffusion layer is constituted by a material exhibiting sufficient gas diffusion and conduction properties, for example carbon cloth formed by weaving carbon fiber yarn. The water repellent layer contains polyethylenefluoroethylene and a carbon material. The catalyst layer is constituted by platinum-carrying carbon black particles.

The cathode 11b is formed on the other surface of the electrolyte membrane 11. The shape, dimensions, and constitution of the cathode 11b are substantially identical to those of the anode 11a.

Referring to FIGS. 5A-5D, the sealing member 12 is attached to the electrolyte membrane 11 via the resin film 11c so as to surround the anode 11a. Similarly, the sealing member 13 is attached to the electrolyte membrane 11 via the resin film 11d so as to surround the cathode 11b.

The sealing members 12 and 13 are constituted by an elastic material such as silicone rubber. The resin films 11c and 11d serve to latch the sealing members 12 and 13 in a predetermined position of the electrolyte membrane 11. The resin films 11c and 11d also serve to reinforce an outer peripheral portion of the electrolyte membrane 11. Furthermore, the resin films 11c and 11d serve to prevent direct contact between the electrolyte membrane 11, which is formed from a polymer membrane, and the sealing members 12 and 13, thereby preventing deterioration of these members caused by a chemical reaction between them. The resin films 11c and 11d are integrated with the sealing members 12 and 13 in advance through heat treatment, whereupon the resulting integral body is adhered to the electrolyte membrane 11 using an adhesive applied to the rear surface thereof.

Figure 4:
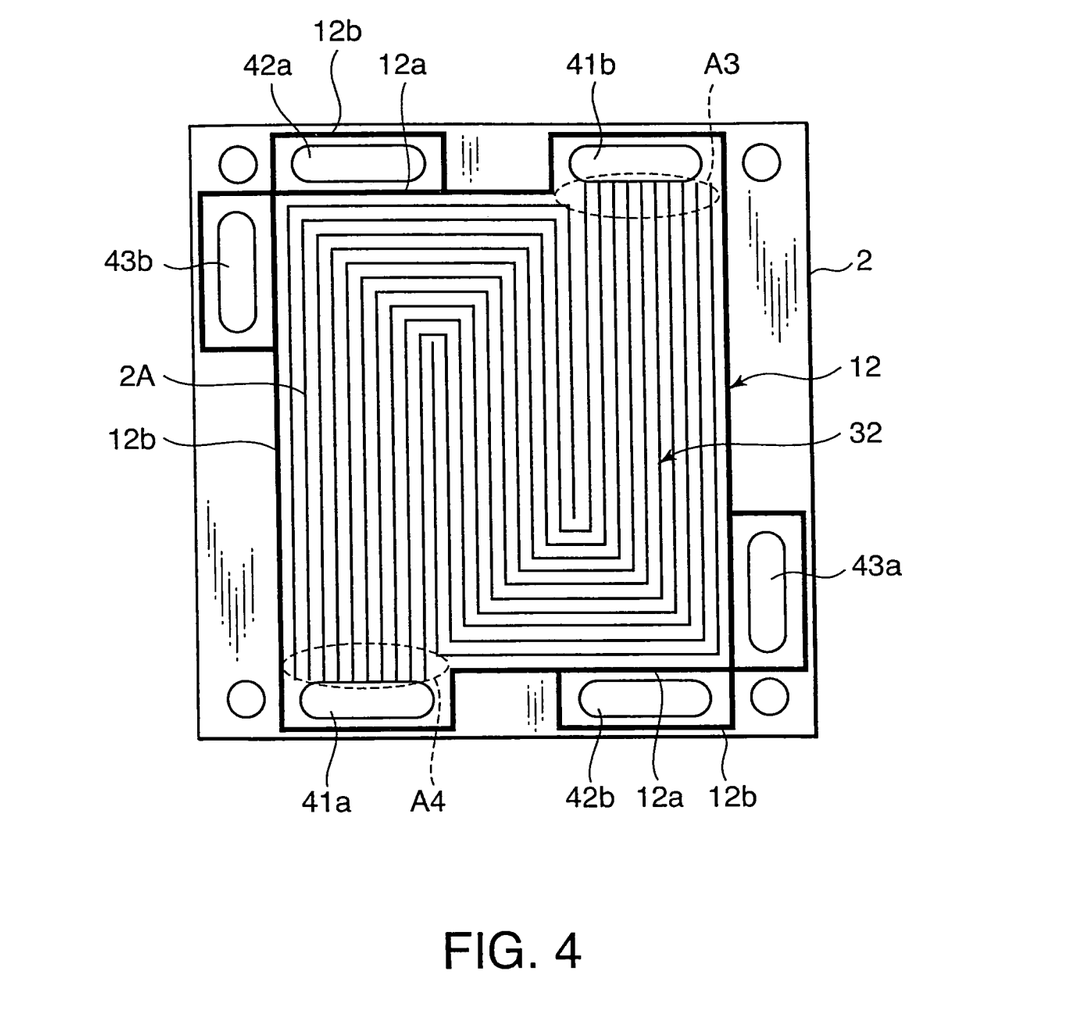
FIG. 4 is a front view of a separator and a sealing member on an anode side, according to this invention.

Referring to FIG. 4, an anode gas passage 32 facing the anode 11a is formed in the first separator 2 facing the anode 11a. The anode gas passage 32 is formed as a collective body of serpentine passages defined by a large number of ribs 2A. The two ends of the anode gas passage 32 are connected to the anode gas supply manifold 41a and the anode gas discharge manifold 41b.

The resin film 11c and the sealing member 12 are disposed so as to seal the entire formation region of the anode gas passage 32 from the outside and surround the cathode gas supply manifold 42a, cathode gas discharge manifold 42b, cooling water supply manifold 43a, and cooling water discharge manifold 43b, thereby maintaining these manifolds in a hermetically sealed state. On the other hand, the resin film 11c and the sealing member 12 are constituted so as not to obstruct communication between the anode gas passage 32 and the anode gas supply manifold 41a and anode gas discharge manifold 41b.

Accordingly, the resin film 11c and the sealing member 12 are not disposed in regions A3 and A4 of the figure, which correspond to connection portions between the two ends of the anode gas passage 32 and the anode gas supply manifold 41a and anode gas discharge manifold 41b, respectively.

Returning to FIG. 2, a cooling water passage 22 is formed in a surface of the first separator 2 on the opposite side of the anode gas passage 32. The cooling water passage 22 is formed as a collective body of serpentine passages defined by a large number of ribs. The two ends of the cooling water passage 22 are connected to the cooling water supply manifold 43a and the cooling water discharge manifold 43b.

The first separator 2 contacts the second separator 3 of the adjacent fuel cell 10. A sealing member 16 for hermetically sealing the entire formation region of the cooling water passage 22 and the anode gas supply manifold 41a, anode gas discharge manifold 41b, cathode gas supply manifold 42a, and cathode gas discharge manifold 42b is sandwiched between the first separator 2 and the second separator 3 of the adjacent fuel cell 10. On the other hand, the sealing member 16 is not disposed between the cooling water passage 22 and the cooling water supply passage 43a and cooling water discharge passage 43b so as not to obstruct communication therebetween.

Figure 3:
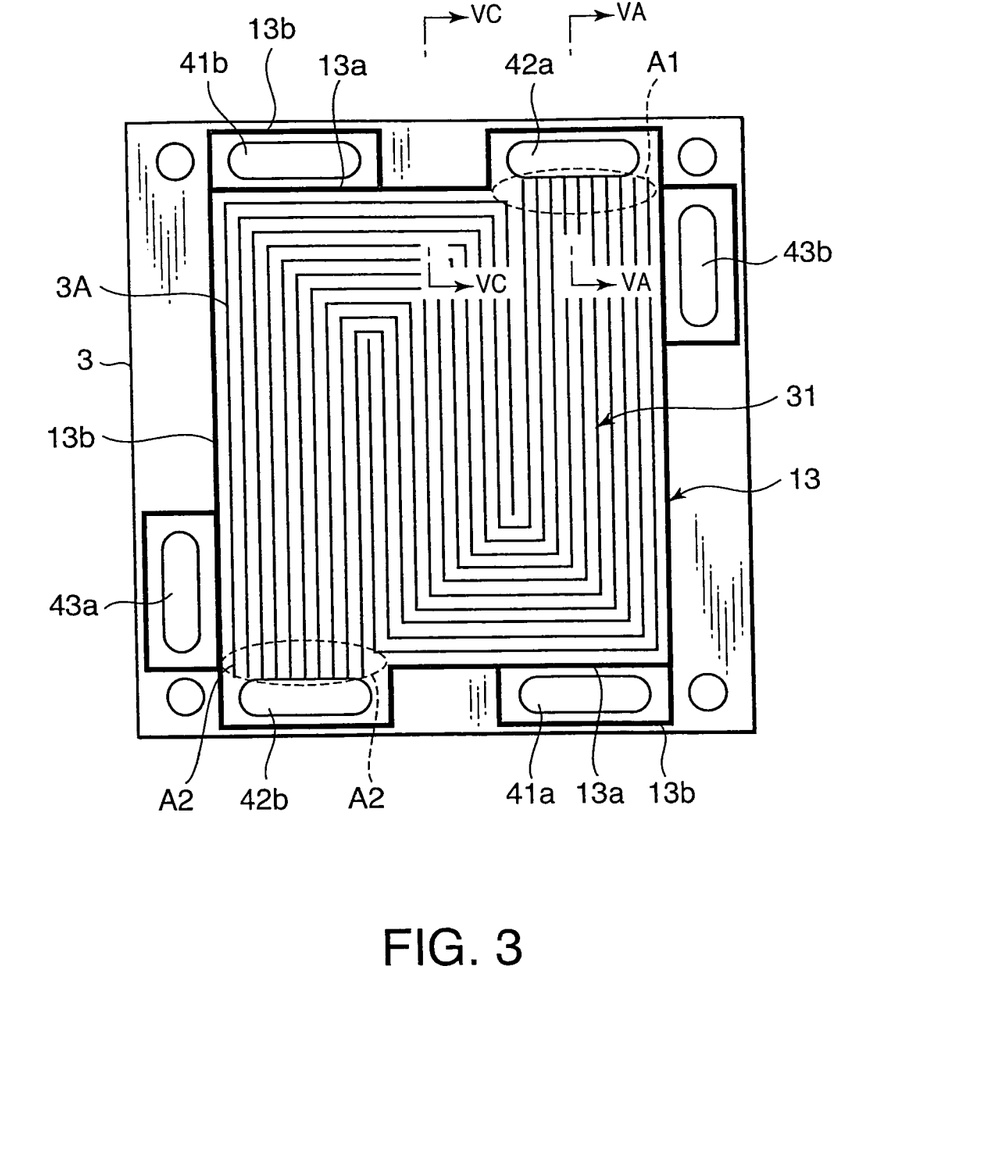
FIG. 3 is a front view of a separator and a sealing member on a cathode side, according to this invention.

Referring to FIG. 3, a cathode gas passage 31 facing the cathode 11b is formed in the second separator 3 facing the cathode 11b. The cathode gas passage 31 is formed as a collective body of serpentine passages defined by a large number of ribs 3A. The two ends of the cathode gas passage 31 are connected to the cathode gas supply manifold 42a and the cathode gas discharge manifold 42b.

The resin film 11d and the sealing member 13 are disposed so as to seal the entire formation region of the cathode gas passage 31 from the outside and surround the anode gas supply manifold 41a, anode gas discharge manifold 41b, cooling water supply manifold 43a, and cooling water discharge manifold 43b, thereby maintaining these manifolds in a hermetically sealed state. On the other hand, the resin film 11d and the sealing member 13 are constituted so as not to obstruct communication between the cathode gas passage 31 and the cathode gas supply manifold 42a and cathode gas discharge manifold 42b. Accordingly, the resin film 11d and the sealing member 13 are not disposed in regions A1 and A2 of the figure, which correspond to connection portions between the two ends of the cathode gas passage 31 and the cathode gas supply manifold 42a and cathode gas discharge manifold 42b, respectively.

The sealing member 13 is constituted by a wide sealing portion 13a and a normal sealing portion 13b. The wide sealing portion 13a is applied to the sealing member 13 disposed on the rear surface of the regions A3 and A4, while the normal sealing portion 13b is applied to the sealing member 13 disposed in the remaining sites.

Returning to FIG. 4, the sealing member 12 is constituted by a wide sealing portion 12a and a normal sealing portion 12b. The wide sealing portion 12a is applied to the sealing member 12 disposed on the rear surface of the regions A1 and A2, as shown in FIG. 5B, while the normal sealing portion 12b is applied to the sealing member 12 disposed in the remaining sites, as shown in FIG. 5D.

Referring to FIGS. 5A-5D, the width of a base portion of the wide sealing portions 12a, 13a, which contacts the resin films 11c and 11d, is greater than that of the normal sealing portions 12b, 13b.

Disposing the wide sealing portion 12a on the rear surface of the regions A1 and A2 and disposing the normal sealing portion 12b in the remaining sites means, in other words, that the normal sealing portion 12b is applied to a site in which the sealing member 13 is disposed on the rear surface of the electrolyte membrane 11 while the wide sealing portion 12a is applied to a site in which the sealing member 13 is not disposed on the rear surface of the electrolyte membrane 11.

Similarly, disposing the wide sealing portion 13a on the rear surface of the regions A3 and A4 and disposing the normal sealing portion 13b in the remaining sites means, in other words, that the normal sealing portion 13b is applied to a site in which the sealing member 12 is disposed on the rear surface of the electrolyte membrane 11 while the wide sealing portion 13a is applied to a site in which the sealing member 12 is not disposed on the rear surface of the electrolyte membrane 11.

By applying the wide sealing portions 12a, 13a, contact surface pressure between the sealing members 12, 13 in the corresponding parts and the electrolyte membrane 11 is reduced.

Figure 5A:
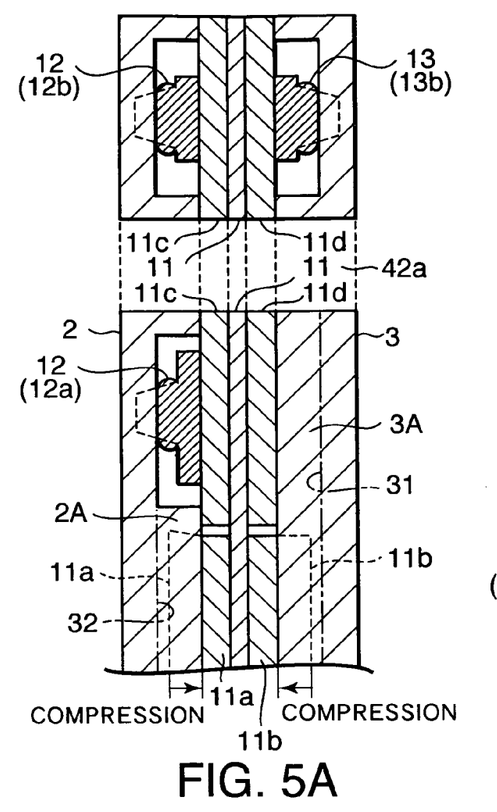
FIGS. 5A-5D are a view seen along an arrow VA-VA in FIG. 3, a view seen along an arrow VC-VC in FIG. 3, and a principal perspective view of the fuel cell.
Figure 5B:
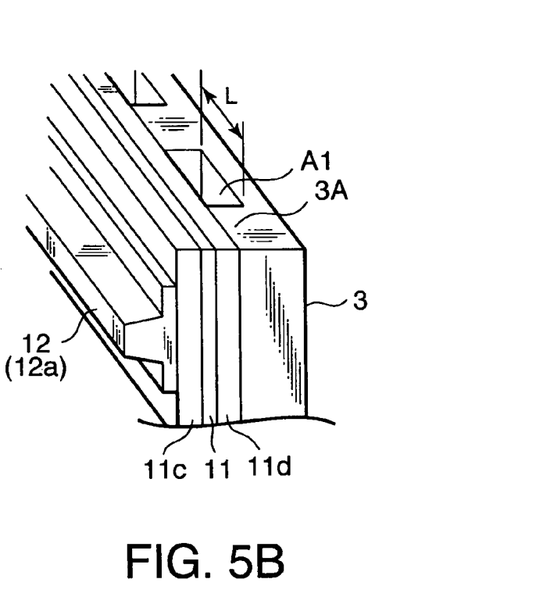
Figure 5C:
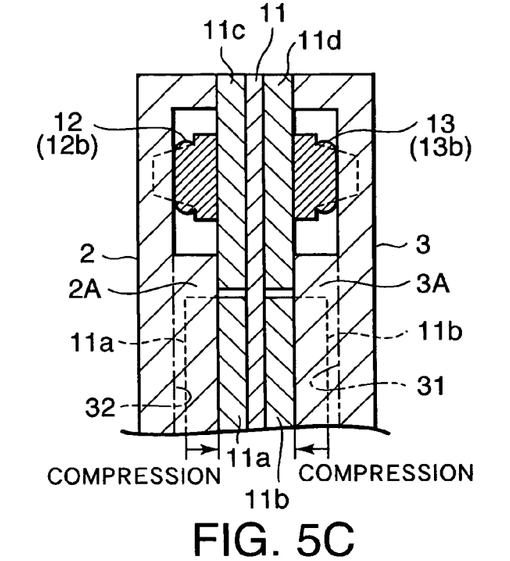
Figure 5D:
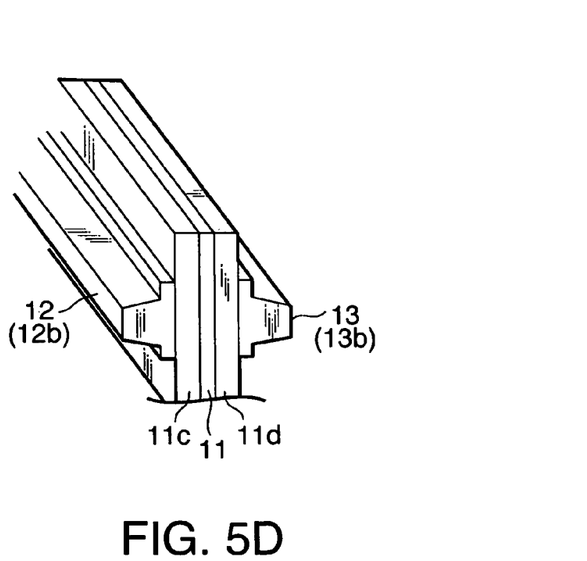

In FIG. 5A, when the fuel cells 10 have been laminated into the fuel cell stack 100, the ribs 3A of the cathode gas passage 31 in the second separator 3 presses the resin film 11c, as shown in FIG. 5B, while deforming the cathode 11b. Hence, in a laminated state, the rear surface of the wide sealing portion 12a of the electrolyte membrane 11 is supported by the ribs 3A, and the rear surface of the wide sealing portion 13a of the electrolyte membrane 11 is similarly supported by the ribs 2A of the anode gas passage 32. As shown in FIG. 5B, an interval between the ribs 3A (2A) is set at L.

Figure 6:
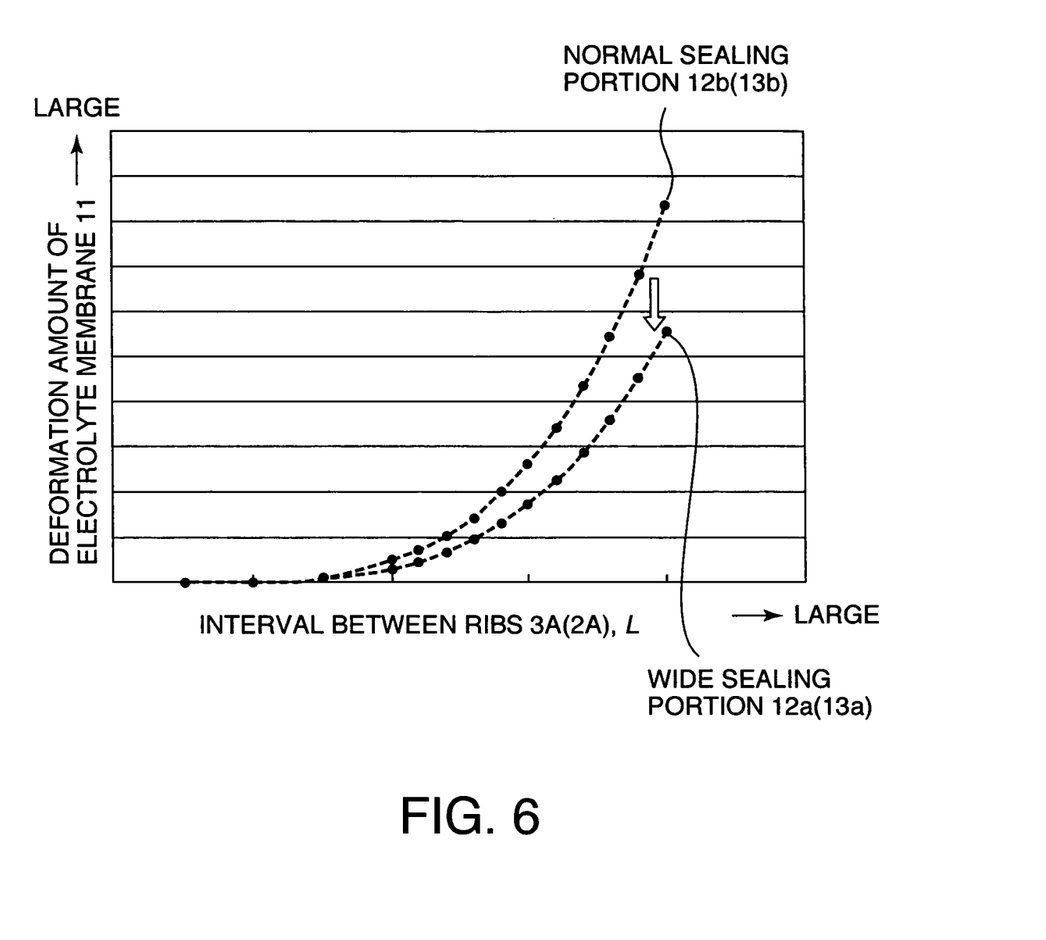
FIG. 6 is a diagram illustrating a relationship between an interval L between ribs of an anode gas passage and a cathode gas passage, and a deformation amount of an electrolyte membrane.

Referring to FIG. 6, as the interval L between the ribs 2A (3A) increases, the amount of deformation generated in the electrolyte membrane 11 by the sealing reactive force of the sealing member 12 (13) also increases. On the other hand, when the wide sealing portion 12a is applied to this part, i.e. to the sealing member 12 disposed on the rear side of the regions A1 and A2, under identical conditions, the contact surface pressure between the sealing member 12 and the electrolyte membrane 11 decreases, and therefore the amount of deformation generated in the electrolyte membrane 11 when the sealing reactive force of the sealing member 12 acts on the electrolyte membrane 11 can be reduced in comparison with a case in which the normal sealing portion 12b is applied to the sealing member 12, as shown by an arrow in the figure. Likewise with regard to the sealing member 13, when the wide sealing portion 13a is applied to the sealing member 13 on the rear side of the regions A3 and A4, the contact surface pressure between the sealing member 13 and the electrolyte membrane 11 decreases, and therefore the amount of deformation generated in the electrolyte membrane 11 when the sealing reactive force of the sealing member 13 acts on the electrolyte membrane 11 can be reduced.

Hence, according to this invention, deformation of the electrolyte membrane 11 can be suppressed without increasing the thickness of the fuel cell 10, and therefore a favorable sealing performance is secured in the sealing members 12, 13.

Figure 7:
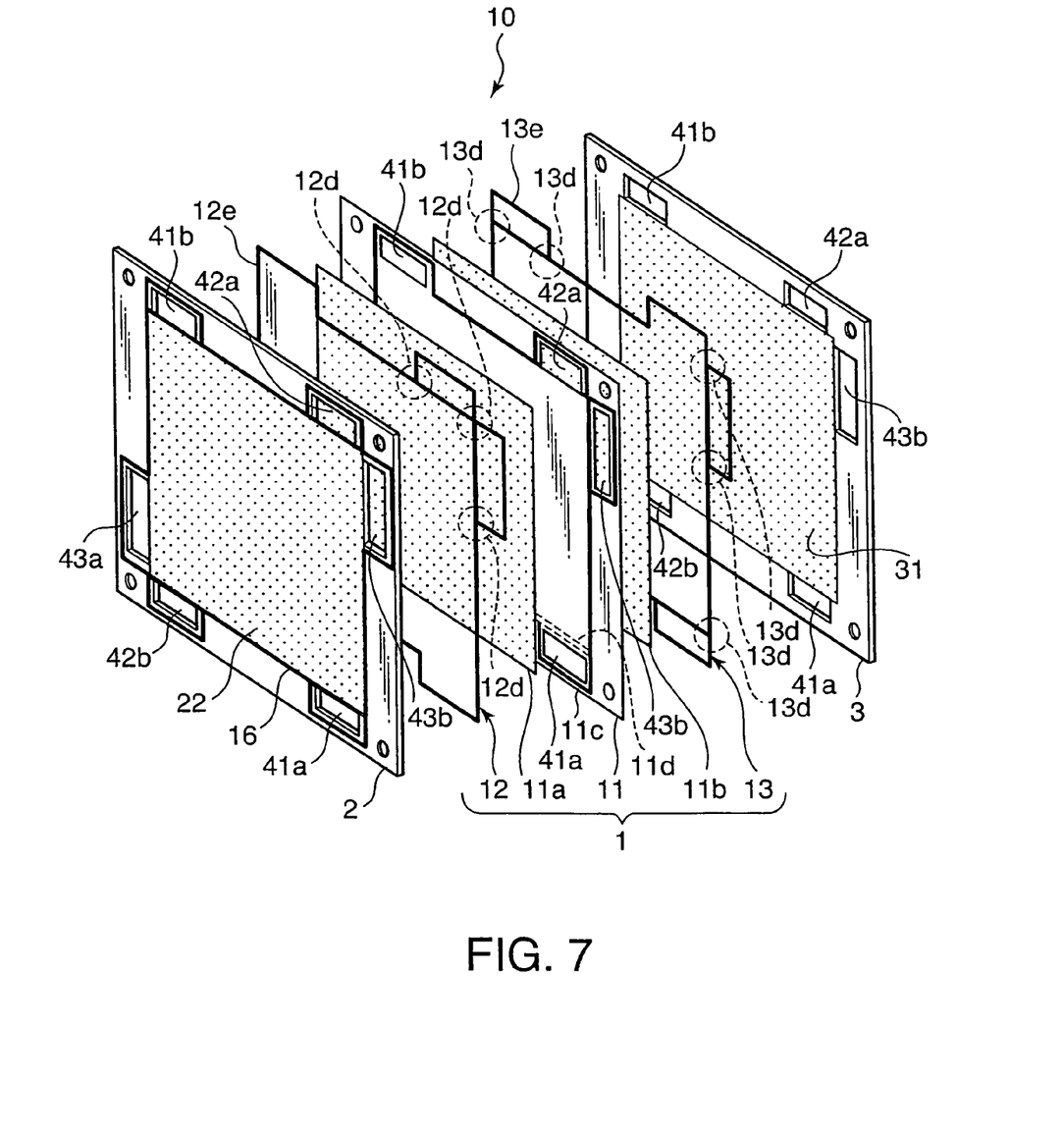
FIG. 7 is similar to FIG. 2, but shows a second embodiment of this invention.

Next, referring to FIG. 7, a second embodiment of this invention will be described.

This embodiment differs from the first embodiment in the constitution of the sealing members 12 and 13. Other constitutions of the fuel cell 10 and fuel cell stack 100 are identical to their counterparts in the first embodiment.

The sealing member 12 is constituted by a wide sealing portion 12d and a normal sealing portion 12e. The wide sealing portion 12d is applied to a joint portion of the sealing member 12, or in other words a location in which a plurality of the sealing members 12 meet. More specifically, the joint portion is formed between the sealing member 12 that surrounds the cathode gas supply manifold 42a, the cathode gas discharge manifold 42b, the cooling water supply manifold 43a and the cooling water discharge manifold 43b, and the sealing member 12 surrounding the entire formation region of the anode gas passage 32.

The sealing member 13 is constituted by a wide sealing portion 13d and a normal sealing portion 13e. The wide sealing portion 13d is applied to a joint portion of the sealing member 13, or in other words a location in which a plurality of the sealing members 13 meet. More specifically, the joint portion is formed between the sealing member 13 that surrounds the anode gas supply manifold 41a, the anode gas discharge manifold 41b, the cooling water supply manifold 43a and the cooling water discharge manifold 43b, and the sealing member 13 surrounding the entire formation region of the anode gas passage 32.

The transverse sectional shape of the wide sealing portions 12d, 13d is identical to that of the wide sealing portions 12a, 13a of the first embodiment. The transverse sectional shape of the normal sealing portions 12e, 13e is identical to that of the normal sealing portions 12b, 13b of the first embodiment.

When the fuel cell stack 100 is assembled, a compressive force acts on the fuel cells 10, and therefore the sealing reactive force of the compressed sealing members 12 and 13 acts on the electrolyte membrane 11.

In the locations where the joint portion of the sealing member 12 and the joint portion of the sealing member 13 contact the electrolyte membrane 11, a larger deformation force acts on the electrolyte membrane 11 than in the locations where the other sites of the sealing members 12 and 13 contact the electrolyte membrane 11. When the portion of the electrolyte membrane 11 that contacts the joint portion deforms greatly as a result, the sealing ability of the sealing members 12 and 13 deteriorates.

In this embodiment, the contact area between the sealing members 12, 13 and the electrolyte membrane 11 is increased by applying the wide sealing portions 12d, 13d to the joint portions of the sealing members 12, 13 in the manner described above. As a result, the deformation pressure per unit contact area applied to the electrolyte membrane 11 by the sealing reactive force decreases, and therefore an increase in the deformation amount of the electrolyte membrane 11 in the intersection portion is prevented such that the sealing performance of the sealing members 12, 13 can be maintained in a favorable condition.

The contents of Tokugan 2004-369790, with a filing date of Dec. 22, 2005 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, this invention is not limited to the fuel cell stack 100 for an automobile, and may be applied to any typical fuel cell stack.

The current collector 20 must be constituted by a gas-impermeable conductive member, but the constitutional material is not limited to densified carbon, and steel plate, for example, may be used.

The insulating plate 30 must be constituted by an insulating member, but is not limited to rubber, and may be constituted by resin.

The endplate 40 and the second endplate 40A require rigidity, but the material thereof is not limited to a metallic material.

The tension rod 50 requires rigidity, but the material thereof is not limited to a metallic material.

The MEA 1 may also be constituted in various ways.

Specifically, the electrolyte membrane 11 must be a proton conductive ion exchange membrane that exhibits favorable electric conductivity in a moistened state. However, the electrolyte membrane 11 is not limited to a fluorine-based resin, and may be constituted by another polymer electrolyte material.

The gas diffusion layer of the anode 11a and cathode 11b requires a sufficient gas diffusion property and sufficient conductivity, but is not limited to carbon cloth, and may be constituted by carbon paper or carbon felt.

The catalyst layer of the anode 11a and cathode 11b need not be carried on the gas diffusion layer, and instead a catalyst layer may be formed by carrying a catalyst formed from platinum or an alloy constituted by platinum and another metal on the surface of the electrolyte membrane 11. In this case, a gas diffusion layer assembly formed by laminating a water repellent layer on the surface of the gas diffusion layer is formed separately and then integrated with the anode 11a and cathode 11b carried on the surface of the electrolyte membrane 11 to form the MEA 1.

The separators 2 and 3 need not be constituted by a thin metal plate as long as they exhibit sufficient conductivity, strength, and corrosion resistance, and may be constituted by a pressed carbon material, for example.

The sealing members 12, 13 are not limited to silicone rubber, and may be constituted by ethylene-propylene-diene monomer (EPDM) rubber or fluorine rubber.

Instead of applying the wide sealing members 12a, 13a to the sealing members 12, 13 disposed on the rear surface of the regions A1-A4 in the first embodiment, the rubber hardness of this part may be reduced below the rubber hardness of the other parts of the sealing members 12, 13. The sealing reactive force of a sealing member having low rubber hardness is small, and therefore the deformation amount of the electrolyte membrane 11 can be reduced. Hence, by forming the sealing members 12, 13 in this manner, identical favorable effects to those of the first embodiment are obtained while maintaining the favorable sealing performance of the sealing members 12, 13. Likewise in the second embodiment, sealing members having low rubber hardness may be applied instead of the wide sealing portions 12d, 13d.

INDUSTRIAL APPLICABILITY

According to the invention described above, deformation of an electrolyte membrane caused by a sealing reactive force can be suppressed without increasing the thickness of a fuel cell, and therefore a favorable sealing performance can be secured in a sealing member. Accordingly, a favorable sealing performance can be obtained without increasing the size of a fuel cell stack. Hence, particularly favorable effects are obtained when this invention is applied to a fuel cell stack installed in an automobile having limited installation space for a fuel cell stack.

The embodiments of this invention in which an exclusive property or privilege is claimed are defined as follows:

1. A sealing structure for use with a fuel cell that comprises an electrolyte membrane having at least one electrode formed on a surface of the electrolyte membrane, and at least one separator formed with a gas passage that faces the at least one electrode, the sealing structure comprising:
    at least one elastic sealing member sandwiched between the electrolyte membrane and the at least one separator,
    wherein the at least one elastic sealing member comprises at least one first portion located in at least one first region of the electrolyte membrane, and at least one second portion located in at least one second region of the electrolyte membrane, the at least one second region being at least one region that is more likely to be deformed than the at least one first region,
    wherein the electrolyte membrane extends beyond the at least one first portion and the at least one second portion in a direction of a width of the at least one first portion and the at least one second portion, and
    wherein the at least one second portion of the at least one elastic sealing member has a larger base width than the at least one first portion of the at least one elastic sealing member.

2. The sealing structure as defined in claim 1, wherein:
    the at least one electrode comprises an anode formed on a first surface of the electrolyte membrane and a cathode formed on a second surface of the electrolyte membrane,
    the at least one separator comprises a first separator contacting the anode and a second separator contacting the cathode, the first separator comprises an anode gas passage facing the anode and the second separator comprises a cathode gas passage facing the cathode, the at least one sealing member comprises a first sealing member sandwiched between the electrolyte membrane and the first separator, and a second sealing member sandwiched between the electrolyte membrane and the second separator, the at least one first region of the electrolyte membrane comprises a region where the first sealing member and the second sealing member overlap in a longitudinal direction of the fuel cell, and the at least one second region of the electrolyte membrane comprises a region where the first sealing member and the second sealing member do not overlap in the longitudinal direction of the fuel cell.

3. The sealing structure as defined in claim 2, wherein:

the fuel cell further comprises a cathode gas supply manifold and a cathode gas discharge manifold that penetrate the electrolyte membrane, the first separator, and the second separator and are connected to the cathode gas passage, and the at least one second region includes at least one of (i) a region in which the cathode gas passage is connected to the cathode gas supply manifold, and (ii) a region in which the cathode gas passage is connected to the cathode gas discharge manifold.

4. The sealing structure as defined in claim 2, wherein:

the fuel cell further comprises an anode gas supply manifold and an anode gas discharge manifold that penetrate the electrolyte membrane, the first separator, and the second separator and are connected to the anode gas passage, and the at least one second region includes at least one of (i) a region in which the anode gas passage is connected to the anode gas supply manifold, and (ii) a region in which the anode gas passage is connected to the anode gas discharge manifold.

5. The sealing structure as defined in claim 1, wherein the at least one sealing member comprises a plurality of sealing sections disposed in an identical plane, and the at least one second portion includes a portion at a joint between at least two of the plurality of sealing sections.

6. The sealing structure as defined in claim 5, wherein:

the at least one electrode comprises an anode formed on a first surface of the electrolyte membrane and a cathode formed on a second surface of the electrolyte membrane, the at least one separator comprises a first separator contacting the anode and a second separator contacting the cathode, the first separator comprises an anode gas passage facing the anode and the second separator comprises a cathode gas passage facing the cathode, the sealing member comprises a first sealing member sandwiched between the electrolyte membrane and the first separator and a second sealing member sandwiched between the electrolyte membrane and the second separator, the fuel cell further comprises:
　a cathode gas supply manifold and a cathode gas discharge manifold that penetrate the electrolyte membrane, the first separator, and the second separator and are connected to the cathode gas passage, and
　an anode gas supply manifold and an anode gas discharge manifold that penetrate the electrolyte membrane, the first separator, and the second separator and are connected to the anode gas passage, the joint is a joint between two or more of: (i) a sealing member section disposed around the anode gas passage, (ii) a sealing member section disposed around the cathode gas supply manifold, and (iii) a sealing member section disposed around the cathode gas discharge manifold.

7. The sealing structure as defined in claim 5, wherein:

the at least one electrode comprises an anode formed on a first surface of the electrolyte membrane and a cathode formed on a second surface of the electrolyte membrane, the at least one separator comprises a first separator contacting the anode and a second separator contacting the cathode, the first separator comprises an anode gas passage facing the anode and the second separator comprises a cathode gas passage facing the cathode, the at least one sealing member comprises a first sealing member sandwiched between the electrolyte membrane and the first separator and a second sealing member sandwiched between the electrolyte membrane and the second separator, the fuel cell further comprises:
　a cathode gas supply manifold and a cathode gas discharge manifold that penetrate the electrolyte membrane, the first separator, and the second separator and are connected to the cathode gas passage,
　an anode gas supply manifold and an anode gas discharge manifold that penetrate the electrolyte membrane, the first separator, and the second separator and are connected to the anode gas passage, and
　a cooling water supply manifold and a cooling water discharge manifold that penetrate the electrolyte membrane, the first separator, and the second separator, the joint is a joint between two or more of: (i) a sealing section disposed around the anode gas passage, (ii) a sealing section disposed around the cathode gas supply manifold, (iii) a sealing section disposed around the cathode gas discharge manifold, (iv) a sealing section disposed around the cooling water supply manifold and (v) a sealing section disposed around the cooling water discharge manifold.

8. The sealing structure as defined in claim 5, wherein:

the at least one electrode comprises an anode formed on a first surface of the electrolyte membrane and a cathode formed on a second surface of the electrolyte membrane, the at least one separator comprises a first separator contacting the anode and a second separator contacting the cathode, the first separator comprises an anode gas passage facing the anode and the second separator comprises a cathode gas passage facing the cathode, the sealing member comprises a first sealing member sandwiched between the electrolyte membrane and the first separator and a second sealing member sandwiched between the electrolyte membrane and the second separator, the fuel cell further comprises:
　a cathode gas supply manifold and a cathode gas discharge manifold that penetrate the electrolyte membrane, the first separator, and the second separator and are connected to the cathode gas passage, and
　an anode gas supply manifold and an anode gas discharge manifold that penetrate the electrolyte membrane, the first separator, and the second separator and are connected to the anode gas passage, the joint is a joint between two or more of: (i) a sealing member section disposed around the cathode gas passage, (ii) a sealing member section disposed around the anode gas supply manifold, and (iii) a sealing member section disposed around the anode gas discharge manifold.

9. The sealing structure as defined in claim 5, wherein:
the at least one electrode comprises an anode formed on a first surface of the electrolyte membrane and a cathode formed on a second surface of the electrolyte membrane,
the at least one separator comprises a first separator contacting the anode and a second separator contacting the cathode,
the first separator comprises an anode gas passage facing the anode and the second separator comprises a cathode gas passage facing the cathode,
the at least one sealing member comprises a first sealing member sandwiched between the electrolyte membrane and the first separator and a second sealing member sandwiched between the electrolyte membrane and the second separator,
the fuel cell further comprises:
  a cathode gas supply manifold and a cathode gas discharge manifold that penetrate the electrolyte membrane, the first separator, and the second separator and are connected to the cathode gas passage,
  an anode gas supply manifold and an anode gas discharge manifold that penetrate the electrolyte membrane, the first separator, and the second separator and are connected to the anode gas passage, and
  a cooling water supply manifold and a cooling water discharge manifold that penetrate the electrolyte membrane, the first separator, and the second separator,
the joint is a joint between two or more of: (i) a sealing section disposed around the cathode gas passage, (ii) a sealing section disposed around the anode gas supply manifold, (iii) a sealing section disposed around the anode gas discharge manifold, (iv) a sealing section disposed around the cooling water supply manifold and (v) a sealing section disposed around the cooling water discharge manifold.

10. The sealing structure as defined in claim 1, wherein the sealing member is attached to the electrolyte membrane via a resin film.

11. A sealing structure for use with a fuel cell that comprises an electrolyte membrane having at least one electrode formed on a surface of the electrolyte membrane, and at least one separator formed with a gas passage that faces the at least one electrode, the sealing structure comprising:
at least one elastic sealing member sandwiched between the electrolyte membrane and the at least one separator,
wherein the at least one elastic sealing member comprises at least one first portion located in at least one first region of the electrolyte membrane, and at least one second portion located in at least one second region of the electrolyte membrane, the at least one second region being at least one region that is more likely to be deformed than the at least one first region,
wherein the at least one second portion of the at least one elastic sealing member has a lower rubber hardness than the at least one first portion of the at least one elastic sealing member,
wherein the at least one electrode comprises an anode formed on a first surface of the electrolyte membrane and a cathode formed on a second surface of the electrolyte membrane,
wherein the at least one separator comprises a first separator contacting the anode and a second separator contacting the cathode,
wherein the first separator comprises an anode gas passage facing the anode and the second separator comprises a cathode gas passage facing the cathode,
wherein the at least one elastic sealing member comprises a first sealing member sandwiched between the electrolyte membrane and the first separator, and a second sealing member sandwiched between the electrolyte membrane and the second separator,
wherein the at least one first region of the electrolyte membrane comprises a region where the first sealing member and the second sealing member overlap in a longitudinal direction of the fuel cell, and
wherein the at least one second region of the electrolyte membrane comprises a region where the first sealing member and the second sealing member do not overlap in the longitudinal direction of the fuel cell.

12. The sealing structure as defined in claim 11, wherein:
the fuel cell further comprises a cathode gas supply manifold and a cathode gas discharge manifold that penetrate the electrolyte membrane, the first separator, and the second separator and are connected to the cathode gas passage, and
the at least one second region includes at least one of (i) a region in which the cathode gas passage is connected to the cathode gas supply manifold, and (ii) a region in which the cathode gas passage is connected to the cathode gas discharge manifold.

13. The sealing structure as defined in claim 11, wherein:
the fuel cell further comprises an anode gas supply manifold and an anode gas discharge manifold that penetrate the electrolyte membrane, the first separator, and the second separator and are connected to the anode gas passage, and
the at least one second region includes at least one of (i) a region in which the anode gas passage is connected to the anode gas supply manifold, and (ii) a region in which the anode gas passage is connected to the anode gas discharge manifold.

14. The sealing structure as defined in claim 11, wherein the sealing member is attached to the electrolyte membrane via a resin film.

15. A sealing structure for use with a fuel cell that comprises an electrolyte membrane having at least one electrode formed on a surface of the electrolyte membrane, and at least one separator formed with a gas passage that faces the at least one electrode, the sealing structure comprising:
at least one elastic sealing member sandwiched between the electrolyte membrane and the at least one separator,
wherein the at least one elastic sealing member comprises at least one first portion located in at least one first region of the electrolyte membrane, and at least one second portion located in at least one second region of the electrolyte membrane, the at least one second region being at least one region that is more likely to be deformed than the at least one first region,
wherein the at least one second portion of the at least one elastic sealing member has a lower rubber hardness than the at least one first portion of the at least one sealing member,
wherein the at least one elastic sealing member comprises a plurality of elastic sealing sections disposed in an identical plane, and wherein the at least one second portion includes a portion at a joint between at least two of the plurality of sealing sections.

16. The sealing structure as defined in claim 15, wherein:
the at least one electrode comprises an anode formed on a first surface of the electrolyte membrane and a cathode formed on a second surface of the electrolyte membrane,
the at least one separator comprises a first separator contacting the anode and a second separator contacting the cathode,
the first separator comprises an anode gas passage facing the anode and the second separator comprises a cathode gas passage facing the cathode,
the sealing member comprises a first sealing member sandwiched between the electrolyte membrane and the first separator and a second sealing member sandwiched between the electrolyte membrane and the second separator,
the fuel cell further comprises:
   a cathode gas supply manifold and a cathode gas discharge manifold that penetrate the electrolyte membrane, the first separator, and the second separator and are connected to the cathode gas passage, and
   an anode gas supply manifold and an anode gas discharge manifold that penetrate the electrolyte membrane, the first separator, and the second separator and are connected to the anode gas passage,
the joint is a joint between two or more of: (i) a sealing member section disposed around the anode gas passage, (ii) a sealing member section disposed around the cathode gas supply manifold, and (iii) a sealing member section disposed around the cathode gas discharge manifold.

17. The sealing structure as defined in claim 15, wherein:
the at least one electrode comprises an anode formed on a first surface of the electrolyte membrane and a cathode formed on a second surface of the electrolyte membrane,
the at least one separator comprises a first separator contacting the anode and a second separator contacting the cathode,
the first separator comprises an anode gas passage facing the anode and the second separator comprises a cathode gas passage facing the cathode,
the at least one sealing member comprises a first sealing member sandwiched between the electrolyte membrane and the first separator and a second sealing member sandwiched between the electrolyte membrane and the second separator,
the fuel cell further comprises:
   a cathode gas supply manifold and a cathode gas discharge manifold that penetrate the electrolyte membrane, the first separator, and the second separator and are connected to the cathode gas passage,
   an anode gas supply manifold and an anode gas discharge manifold that penetrate the electrolyte membrane, the first separator, and the second separator and are connected to the anode gas passage, and
   a cooling water supply manifold and a cooling water discharge manifold that penetrate the electrolyte membrane, the first separator, and the second separator,
the joint is a joint between two or more of: (i) a sealing section disposed around the anode gas passage, (ii) a sealing section disposed around the cathode gas supply manifold, (iii) a sealing section disposed around the cathode gas discharge manifold, (iv) a sealing section disposed around the cooling water supply manifold and (v) a sealing section disposed around the cooling water discharge manifold.

18. The sealing structure as defined in claim 15, wherein:
the at least one electrode comprises an anode formed on a first surface of the electrolyte membrane and a cathode formed on a second surface of the electrolyte membrane,
the at least one separator comprises a first separator contacting the anode and a second separator contacting the cathode,
the first separator comprises an anode gas passage facing the anode and the second separator comprises a cathode gas passage facing the cathode,
the sealing member comprises a first sealing member sandwiched between the electrolyte membrane and the first separator and a second sealing member sandwiched between the electrolyte membrane and the second separator,
the fuel cell further comprises:
   a cathode gas supply manifold and a cathode gas discharge manifold that penetrate the electrolyte membrane, the first separator, and the second separator and are connected to the cathode gas passage, and
   an anode gas supply manifold and an anode gas discharge manifold that penetrate the electrolyte membrane, the first separator, and the second separator and are connected to the anode gas passage,
the joint is a joint between two or more of: (i) a sealing member section disposed around the cathode gas passage, (ii) a sealing member section disposed around the anode gas supply manifold, and (iii) a sealing member section disposed around the anode gas discharge manifold.

19. The sealing structure as defined in claim 15, wherein:
the at least one electrode comprises an anode formed on a first surface of the electrolyte membrane and a cathode formed on a second surface of the electrolyte membrane,
the at least one separator comprises a first separator contacting the anode and a second separator contacting the cathode,
the first separator comprises an anode gas passage facing the anode and the second separator comprises a cathode gas passage facing the cathode,
the at least one sealing member comprises a first sealing member sandwiched between the electrolyte membrane and the first separator and a second sealing member sandwiched between the electrolyte membrane and the second separator,
the fuel cell further comprises:
   a cathode gas supply manifold and a cathode gas discharge manifold that penetrate the electrolyte membrane, the first separator, and the second separator and are connected to the cathode gas passage,
   an anode gas supply manifold and an anode gas discharge manifold that penetrate the electrolyte membrane, the first separator, and the second separator and are connected to the anode gas passage, and
   a cooling water supply manifold and a cooling water discharge manifold that penetrate the electrolyte membrane, the first separator, and the second separator,
the joint is a joint between two or more of: (i) a sealing section disposed around the cathode gas passage, (ii) a sealing section disposed around the anode gas supply manifold, (iii) a sealing section disposed around the anode gas discharge manifold, (iv) a sealing section disposed around the cooling water supply manifold and (v) a sealing section disposed around the cooling water discharge manifold.

20. The sealing structure as defined in claim 15, wherein the sealing member is attached to the electrolyte membrane via a resin film.

* * * * *